United States Patent [19]

Kajinaga et al.

[11] 4,223,874
[45] Sep. 23, 1980

[54] SHAFT FURNACE FOR PRODUCING LOW-OXYGEN IRON-BASE METALLIC POWDER FOR POWDER METALLURGY

[75] Inventors: Yoshihiro Kajinaga; Minoru Nitta; Ichio Sakurada; Shunji Ito, all of Chiba, Japan

[73] Assignee: Kawasaki Steel Corporation, Kobe, Japan

[21] Appl. No.: 938,053

[22] Filed: Aug. 30, 1978

[30] Foreign Application Priority Data

Sep. 10, 1977 [JP] Japan .............................. 52-108354

[51] Int. Cl.³ .......................... C22D 1/42; C22C 33/02
[52] U.S. Cl. .................................. 266/129; 219/10.47; 219/10.49 R; 219/10.51; 266/137; 266/259
[58] Field of Search .............. 266/137, 128, 129, 259, 266/260, 208, 174; 219/7.5, 10.47, 10.49 R, 10.51; 75/0.5 BA

[56] References Cited

U.S. PATENT DOCUMENTS

| | | | |
|---|---|---|---|
| 1,691,349 | 11/1878 | Harrington et al. | 266/129 |
| 2,980,527 | 4/1961 | Strong | 266/137 |
| 3,429,563 | 2/1969 | Anderson et al. | 266/128 |
| 3,441,452 | 4/1969 | Westeren | 266/128 |
| 3,441,452 | 4/1969 | Westeren | 266/259 |
| 3,589,696 | 6/1971 | Westeren, et al. | 266/128 |
| 3,966,454 | 6/1976 | Ito et al. | 75/0.5 BA |

FOREIGN PATENT DOCUMENTS

50-14594  3/1975 Japan.

Primary Examiner—L. Dewayne Rutledge
Assistant Examiner—Michael L. Lewis

[57] ABSTRACT

A shaft furnace for producing low-oxygen iron-base metallic powder for metallurgy is disclosed. The shaft furnace comprises a zone of storing and feeding a metallic raw powder, a preheating zone, an induction heating zone and a zone of cutting and cooling a product cake in a vertical array from top to bottom. The preheating zone and induction heating zone have a special structure for ensuring a smooth descent of the raw powder and the cake.

5 Claims, 10 Drawing Figures

FIG.1

FIG_2

FIG_3

SHAFT FURNACE FOR PRODUCING LOW-OXYGEN IRON-BASE METALLIC POWDER FOR POWDER METALLURGY

This invention relates to a shaft furnace for producing low-oxygen iron-base metallic powder for powder metallurgy by reducing and annealing the raw powder as water-atomized or the like to a final reduction.

Generally, iron-base metallic powders being alloyed strongly with oxidative elements such as Mn, Cr and the like have been produced by a water atomizing method. However, in this case, if the final reduction has been carried out by conventionally well-known gas reduction method and the like, the iron-base metallic powder having a sufficiently low-oxygen content could not be obtained. In this connection, the inventors have already proposed a process wherein iron-base metallic raw powder to be subjected to a final reduction is previously alloyed and/or admixed with carbon or carbonaceous granule as a reducing agent and then deoxidized under vacuum while heating by induction as described in Japanese Pat. laid open No. 1,353/76 and No. 110,208/77. As an apparatus for effectively carrying out the above process, an outline of a shaft furnace comprising a preheating zone and an induction heating zone is also proposed in Japanese Pat. laid open No. 110,208/77, which is advantageously adaptable to solve the above described drawbacks of the prior art.

This invention is fundamentally concerned with the aforementioned shaft furnace and is to improve this furnace on the basis of results of the later researches on the production of low-oxygen iron-base metallic powder by preheating a starting powder in a non-oxidizing atmosphere and then reducing it by induction heating in the same atmosphere.

Furthermore, the invention is to provide a structure comprising a preheating zone and an induction heating zone which is able to ensure stable operation by smoothly descending a starting powder, a preliminarily sintered cake and the like through a preheating tube vertically located in a center of a preheating furnace body.

Moreover, the invention is to solve inconveniences caused by vertical array of the preheating zone and induction heating zone as described above. That is, the invention provides a structure of connection part capable of absorbing expansion and contraction of preheating tube caused by heating and cooling of the preheating furnace body while holding vacuum in the shaft furnace.

And also, the invention is to provide a shaft furnace comprising the above described zones in a vertical array which is able to facilitate its maintenance by simply demounting only a part of the furnace, i.e. the induction heating zone.

The invention will now be described in greater detail with reference to the accompanying drawings, wherein.

Figure 1:
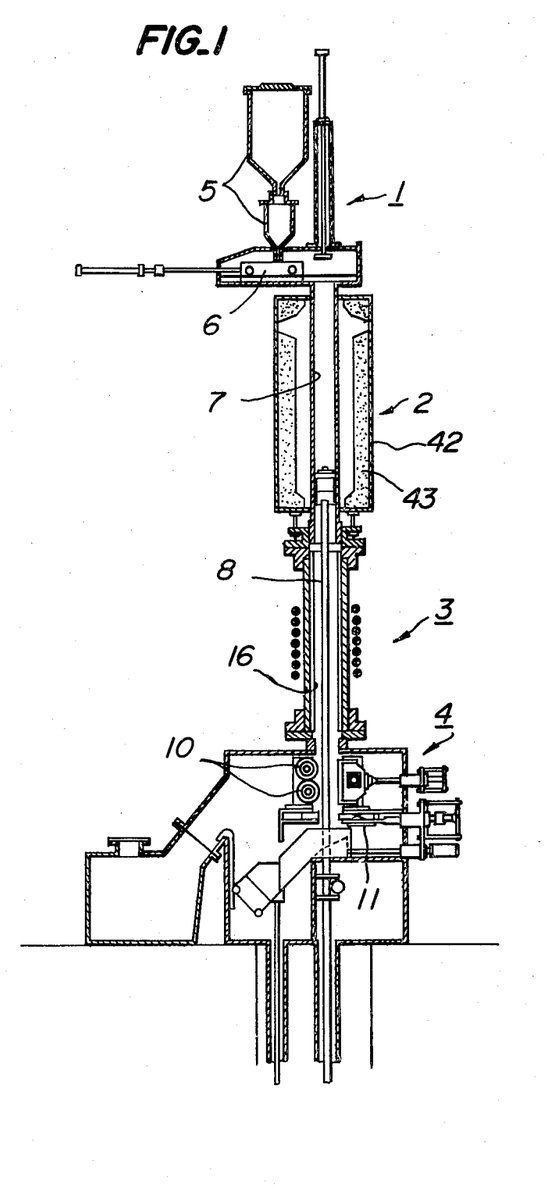
FIG. 1 is a schematically elevational view partly shown in section of a shaft furnace according to the invention.

In FIG. 1, an outline of the vertical-type reducing and annealing apparatus, i.e. the shaft furnace according to the invention which comprises a zone 1 of storing and feeding an iron-base metallic raw powder, a preheating zone 2, an induction heating zone 3 and a zone 4 of cutting and cooling the resulting deoxidized cake is schematically shown.

First of all, the metallic raw powder obtained, for example, by water atomizing process or the like, which is subjected to a final reduction, is stored in a hopper 5 of the storing and feeding zone 1 and then a predetermined amount of the raw powder is intermittently charged into a preheating tube 7 of the preheating zone 2 through a feeder 6, where the raw powder is accumulated on a supporting bar 8 in the preheating tube 7. The supporting bar 8 is gradually descended downwardly in the preheating tube 7, during which the accumulated raw powder is partly deoxidized and decarburized and slightly sintered to form a preheated cake with cylindrically sintered shell layer. Thereafter, the preheated cake gradually changes into a column-like sintered block while further descending and finally arrive at the induction heating zone 3. In the induction heating zone 3, the cake is subjected to strong deoxidation and decarburization reaction (or a relatively strong sintering reaction) during the descending through an insulating ceramic tube 16 in a cylindrical coil 18 without contacting with the inner wall of the tube 16, whereby a column-like sintered product cake is formed. The product cake is pulled off slowly and continuously through pinch rollers 10 in the cake cutting and cooling zone 4, where the cake was cut into pieces of a given size by means of a cutting device 11, cooled and removed out from the apparatus. In brief, the above-mentioned apparatus including the shaft furnace according to the invention is to produce desired low-oxygen metallic powder by subjecting the previously adjusted raw powder to a final reduction with a reducing agent inclusive of alloyed carbon in a non-oxidizing atmosphere (mainly reduced pressure or vacuum).

Figure 2:
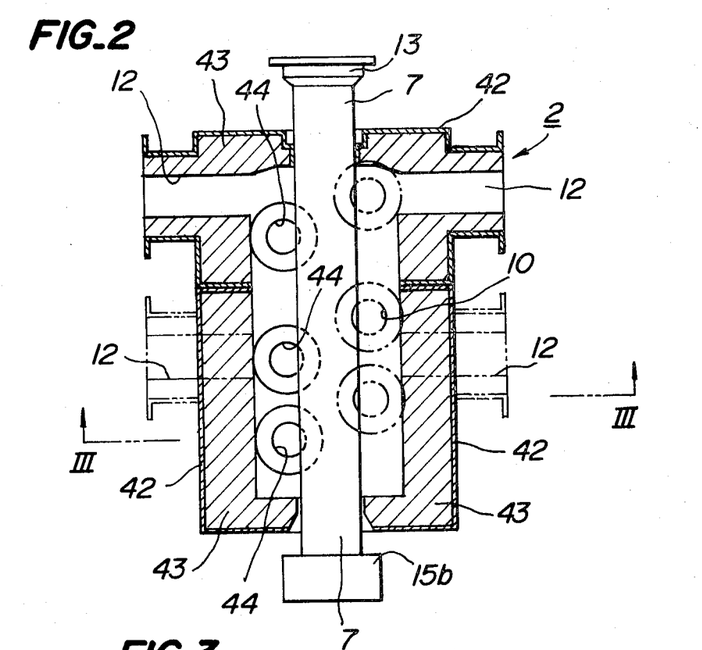
FIG. 2 is a longitudinal sectional view of an embodiment of the preheating zone constituting the shaft furnace according to the invention.
Figure 3:
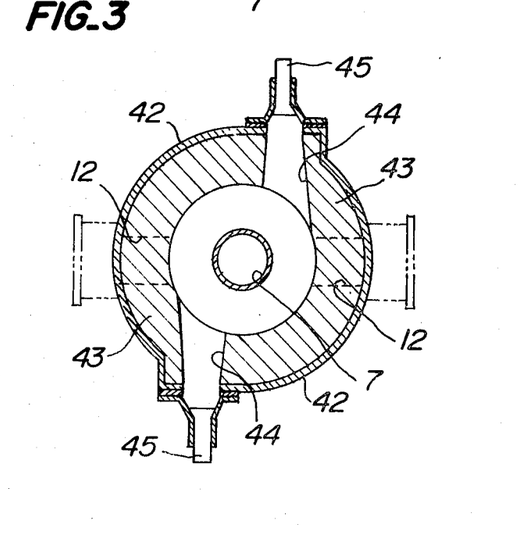
FIG. 3 is a transverse sectional view taken along a line III—III of FIG. 2.

FIGS. 2 and 3 show longitudinal and transverse cross sections of the preheating zone 2 located at an upper part of the vertical-type shaft furnace according to the invention. This preheating zone 2 is characteristic of such a point that the preheating tube 7 longitudinally passing through the furnace body at its center is uniformly heated with respect to the cylindrical outer part of the furnace body. That is, the structure of the preheating zone is such constructed that uniform heating in circumferential direction at transverse section and smooth descending of the raw powder accumulated in the preheating tube 7 are ensured by the uniform heating of the tube 7. On the other hand, if the heating of the preheating tube becomes nonuniform, there is caused a drawback of injuring a true circle degree of the tube. Particularly, if there is a great difference in the heating temperature at the circumference of the preheating tube, a difference of elongation is caused by thermal expansion toward a bus line of the preheating tube due to the above heating temperature difference and hence the preheating tube itself is bent in its axial direction. Consequently, the descending due to weight of the raw powder accumulated in the preheating tube is considerably obstructed, so that there are caused operation troubles such as the requirement of applying a large pressure from the upside and the like.

Referring to FIGS. 2 and 3, the preheating zone 2 comprises a cylindrical outer steel enclosure 42 lined with a refractory cement 43. The preheating tube 7 passes through the enclosure 42 at its center along the axial direction. In a space defined between the outer wall of the preheating tube 7 and the inner wall of the enclosure is projected a flame by means of a burner for combustion of heavy oil, natural gas, coke oven gas and the like, whereby the preheating tube is heated from its outside and hence the raw powder accumulated therein is indirectly heated to form a preheated cake with cylindrically sintered shell layer.

In the preheating zone 2 plural flame projecting ports 44 are provided. These ports 44 are placed side by side at a constant interval in the axial direction (or longitudinal direction) of the zone 2. Further, these ports are arranged at plural positions (two positions in FIG. 2) in the circumferential direction of the zone 2 such that the ports are shifted with each other with respect to the axial direction. That is, these ports 44 are arranged in a zigzag form with each other. On the flame projecting ports 44 are mounted burners 45 for heavy oil, natural gas or the like, respectively. These burners 45 are fixed so as to direct toward a tangential line of the inner wall of the enclosure or the outer wall of the preheating tube 7. Thus, flames projected from the ports 44 turn upwardly in spiral motion along the inner wall of the enslosure, whereby the preheating tube 7 is heated. In this case, the temperature distribution in the radial direction of the zone 2 becomes substantially uniform, so that the preheating tube 7 itself is heated uniformly.

Moreover, it is necessary to control the temperature distribution in the longitudinal direction of the zone 2 so as to make the temperature in the lower part of the zone higher than that in the upper part thereof. When the raw powder accumulated in the preheating tube, is heated while descending through the preheating zone to form the preheated cake with cylindrically sintered shell layer, if the temperature in the upper part of the preheating zone is higher than that of its lower part, the bulging of the cake is caused at that upper part to form a lower contracted cake, so that the descent of the cake is impossible. Therefore, an exhaust port 12 for combustion gas is so disposed as to adjust the temperature distribution in the longitudinal direction at a desirable gradient. For example, when the preheating tube 7 is elongated into the longitudinal direction as shown in FIG. 2, the exhaust ports 12 may be arranged at a position corresponding to the upmost burner and a position above the middle burner. In the embodiment of FIG. 2, the two file burners 45 are symmetrically disposed with respect to the axial direction of the preheating tube 7, so that the exhaust ports 12 are arranged at positions perpendicular to these burners 45 as shown in FIG. 3.

In order to ensure the smooth descending of the accumulated raw powder through the preheating zone, the structure of the preheating tube 7 itself is also important in addition to the uniform heating. That is, when the temperature of the preheating zone 2 is raised, barrelling is caused in the middle of the preheating tube 7 as shown by dot-dash lines 14 of FIG. 4 and also the preheated cake with cylindrically sintered shell layer is expanded and as a result, clogging phenomenon is caused in a cooling region 15 beneath the preheating zone 2, whereby the descending of the preheated cake is obstructed. Therefore, in order to eliminate the above drawbacks, the preheating tube 7 is tapered so as to enlarge the inner diameter from the upper end to the lower end and further the inner surface of the tube is cut off stepwisely by lathe near the lower end to form a larger diameter part.

Figure 4:
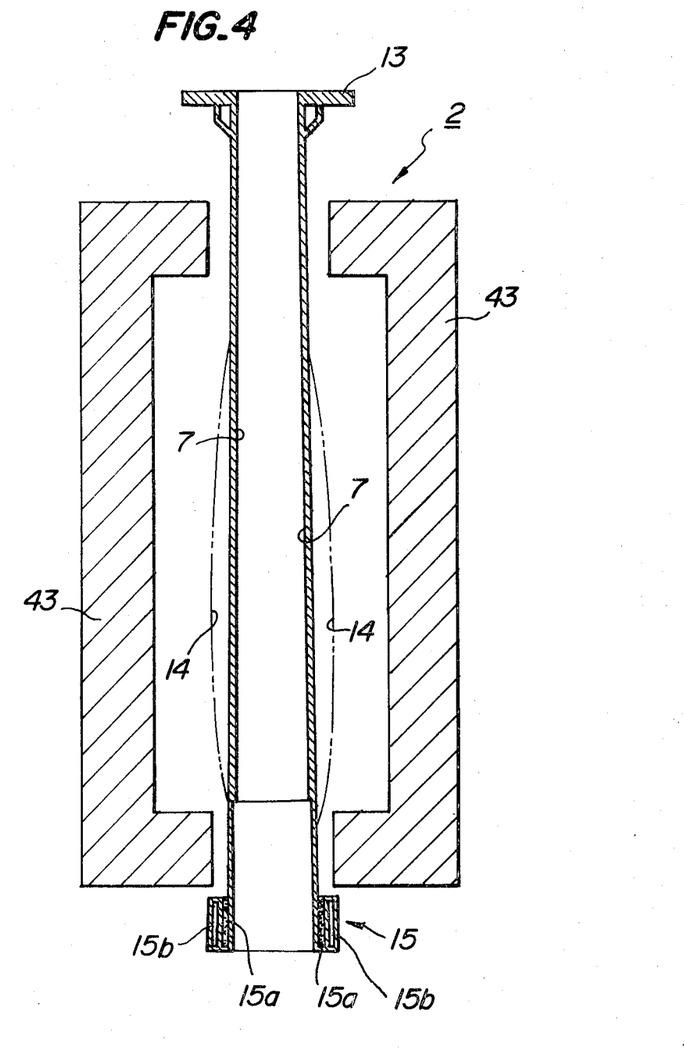
FIG. 4 is an enlarged sectional view of a preheating tube disposed in the preheating zone.

On the upper end of the preheating tube is provided a water cooled flange 13 and also on the lower end thereof is provided a water jacket 15b through an adiabatic or heat insulative material 15a. This water jacket 15b serves to protect an O-ring, which is used for airtightly connecting the preheating tube 7 to the induction heating zone 3, against heat. Moreover, the inclination of the preheating tube 7 is suitable within a range of 1/300 to 1/50. When the inclination is less than 1/300, the frictional resistance between the preheated cake and the inner wall of the tube becomes large and the smooth descending of the cake cannot be achieved. While, when the inclination is more than 1/50, the gap between the cake and the inner wall of the tube becomes large and hence the falling down of the unsintered raw powder becomes violent. And also, oxidizing gases such as $CO_2$, $H_2O$ and the like, which are generated in the upper part of the preheating tube 7, pass through the gap between the cake and the inner wall of the tube and then are downwardly exhausted by suction, whereby there may be caused a reoxidation of the reduced cake. Besides with the increase of the gap, the heat conduction from the exterior heat source becomes poor and consequently the sintering of the cake is insufficient.

Beneath the preheating zone 2 is disposed the induction heating zone 3 including inside an insulating ceramic tube 16 to be communicated with the preheating tube 7. The induction heating zone 3 comprises a water-cooled primary coil 17 for excitation in a spiral form at its outermost part and a water-cooled secondary coil 18 for heating disposed concentrically inside the coil 17. Particularly, the secondary coil 18 itself is constructed as a side wall of the induction heating zone 3, i.e. a furnace body for induction heating by inserting an insulative packing 19 into a gap generated along the bus line of the coil 18.

When the secondary coil 18 itself is turned to account as a part of the furnace body of the shaft furnace, there may be caused the following drawbacks: First of all, when the sintering and reduction reaction (or the final reduction) is carried out in the induction heating zone 3 while passing the columnar preheated cake through the reaction tube in a suspended state, carbon deposition occurs from CO gas generated by the reducing reaction and the deposited carbon adheres to the inner wall of the tube. As a result, the adhesion of deposited carbon forms a short circuit to cause dielectric breakdown. In addition to the deposited carbon, iron particles isolated from the cake adhere to the inner wall of the tube, resulting in the dielectric breakdown.

Secondly, the water cooling system of the secondary coil 18 takes heat in the reaction tube, so that the heat efficiency is poor and the energy cost becomes high.

Further, the thermal shock in the application of the voltage becomes large and the service lift of the secondary coil 18 becomes short.

Figure 5:
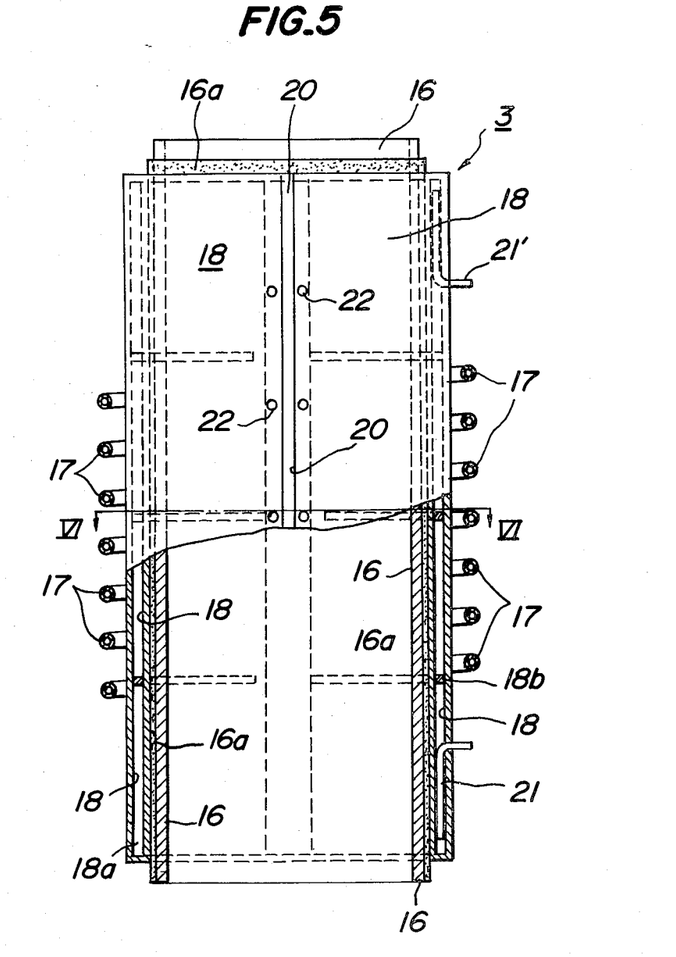
FIGS. 5 and 6 are front elevational view partly shown in section and transverse sectional view of an embodiment of the induction heating zone constituting shaft furnace according to the invention, respectively.
Figure 6:
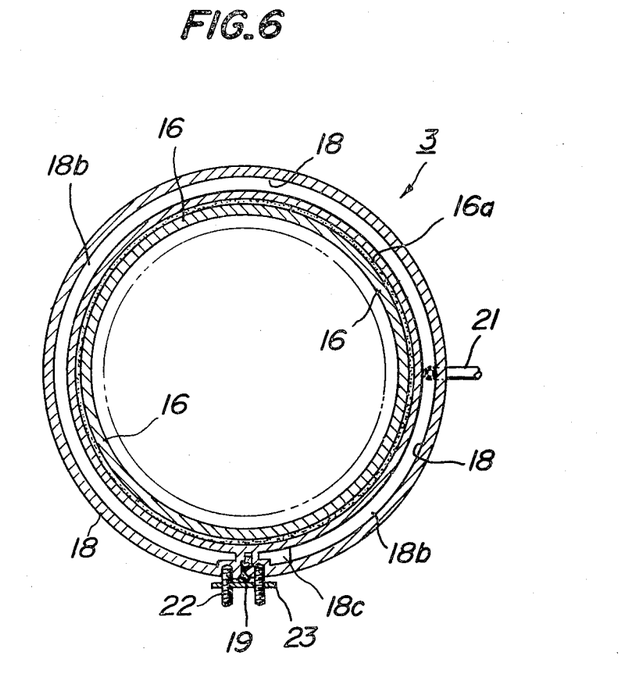

According to the invention, the induction heating zone 3 has a structure solving the above mentioned drawbacks as shown in FIGS. 5 and 6. In the embodiment of these drawings, the primary coil 17 for excitation is a hollow copper tube in a spiral form, through which a cooling water is circulated. An electric current is applied across both ends of the primary coil 17 from a high or low frequency power source (not shown). The secondary coil or heating coil 18 (to form one turn coil) is a hollow band-like copper plate disposed in a sleeve form, wherein a cooling water is circulated from an inlet pipe 21' to an outlet pipe 21' through an inner space 18a. As shown in FIG. 5, it is preferable that a plurality of partitions 18b each having a notch 18c are arranged at a proper interval toward the axial direction in the inner space 18a of the coil 18 in order to efficiently improve the water cooling effect.

Further, the secondary coil 18 has a constant gap or slit 20 along its bus line. This slit is filled with an insulating airtight packing 19 to form a complete cylindrical body of the secondary coil 18. Then, the opposite ends of the secondary coil 18 are butt jointed through an insulative plate 23 by means of stud bolts 22 located at proper intervals along the longitudinal direction of each end. Thus, the secondary coil 18 acts as a side wall of the heating zone (i.e. a part of the furnace body wall).

The primary coil 17 serves as an excitation coil and is applied with a high voltage and a low current. While, the secondary coil 18 serves as a heating coil and transforms the above voltage and current into a low voltage and a high current, whereby the preheated cake is heated by induction during the descending of the cake. In brief, the structure of the induction heating zone 3 according to the invention acts as a transformer by the combination of the primary coil 17 and the secondary coil 18. Especially, the secondary coil 18 for heating serves as a furnace body wall, so that the primary coil 17 for excitation can be disposed in the atmosphere. As a result, even if the high voltage is applied to the primary coil 17, there is no risk of electric discharge and hence the power supply equipment becomes cheap as compared with that of a low voltage and high current. Moreover, the secondary coil 18 gives a low voltage and a high current owing to a low impedance, so that a special treatment for electric insulation is not required even if the inside space of the coil 18 is retained under vacuum, and there is no risk of electric discharge under vacuum.

Furthermore, an adiabatic material 16a is closely inserted between the secondary coil 18 and the insulating ceramic tube 16. The adiabatic material 16a is composed of, for example, ceramic fibers. The presence of the adiabatic or heat insulative material 16a prevents the taking away of heat from the inside of the ceramic tube 16 by water cooling of the secondary coil 18. And also, the ceramic tube 16 consists mainly of alumina and is electrically insulated with the secondary coil 18 itself, so that the dielectric breakdown due to the adhesion of deposited carbon and isolated iron particles is completely prevented.

Figure 7:
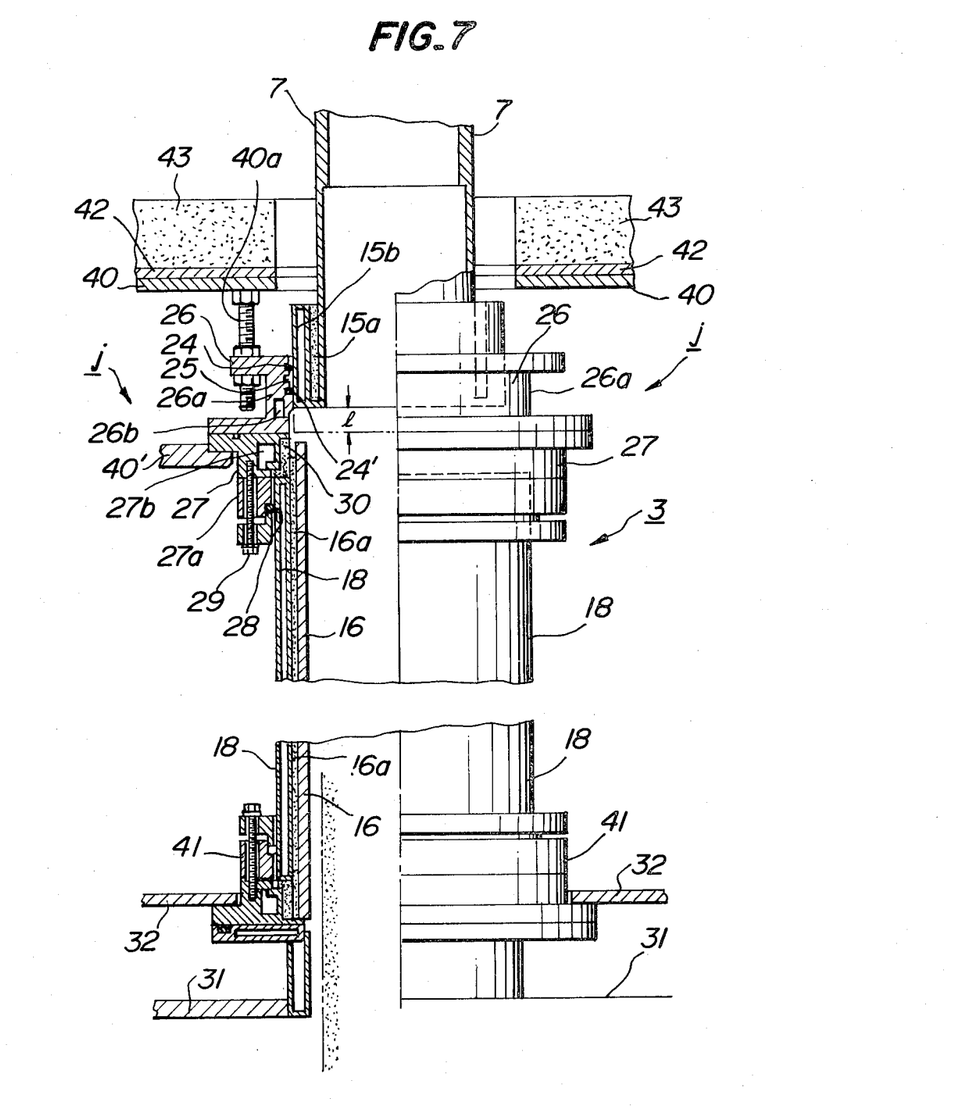
FIG. 7 is a schematic elevational view partly cutaway and partly shown in section of a slidable flange coupling and a connection flange for connecting the induction heating zone to each of the preheating zone and the cake cutting and cooling zone.

According to the invention, the preheating tube 7 is fixed at its upper end and is free at its lower end, because when the preheating tube 7 passing through the preheating zone 2 is fixed at its lower end, there is caused the buckling or bending of the tube 7 due to the heat. Therefore, it is necessary to support slidably the lower end of the preheating tube 7 so as to compensate the thermal expansion. Further, the shaft furnace according to the invention should be held under high vacuum, so that it is necessary to seal airtightly the connection part between the preheating zone 2 and the induction heating zone 3 under vacuum. In order to satisfy these requirements, there is used a water-cooled slidable flange coupling j as shown in FIG. 7.

This slidable flange coupling j comprises an upper flange part 26 surrounding the water jacket 15b mounted around the lower end of the preheating tube 7, and a lower flange part 27 connected to the upper flange part 26 by means of bolts and surrounding the upper end of the secondary coil 18. The upper flange part 26 includes a cylindrical body 26a having grooves 24, 24' for O-ring and a grease groove 25 at its inner wall and a water cooling space 26b at its inside. The lower flange part 27 includes a cylindrical body 27a formed by superposing two insulative bakelite rings one upon the other through an O-ring 28 and fixed to the flange part itself by means of bolts 29, and a water cooling space 27b at its inside. Further, an insulating material 30 such as Micarex (trade name), castable refractory or the like is inserted into a space defined by the inner wall of the lower flange part 27, the upper end of the secondary coil 18 and the outer surface of the ceramic tube 16, whereby the lower flange part 27 is surely and electrically insulated with the secondary coil 18. Furthermore, the upper and lower flange parts 26, 27 are secured to brackets 40, 40' projected from a supporter for the furnace (not shown) by means of bolts and nuts 40a.

Moreover, between the lower end of the preheating tube 7 and the upper end of the ceramic tube 16 is formed a space capable of absorbing mainly an axial expansion l of the preheating tube 7. Therefore, the slidable flange coupling j is so arranged that the axial expansion l of the preheating tube 7 can be allowed by the slidable movement of the water jacket 15b with respect to the cylindrical body 26a of the upper flange part 26.

Thus, the adoption of the slidable flange coupling j as mentioned above can eliminate various drawbacks accompanied with the vertical array of the preheating zone 2 and the induction heating zone 3.

Figure 8:
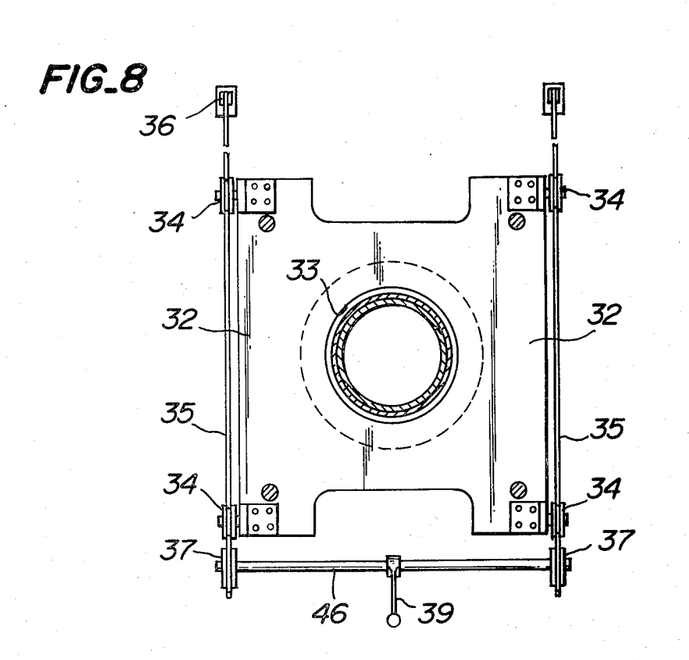
FIG. 8 is a plan view of a demountable structure part of the induction heating zone.
Figure 9:
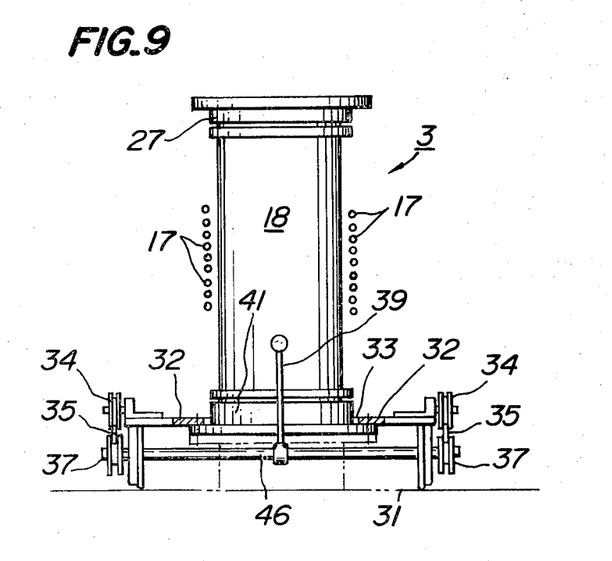
FIGS. 9 and 10 are elevational view partly shown in front and side view of the demountable structure part of FIG. 8, respectively.
Figure 10:
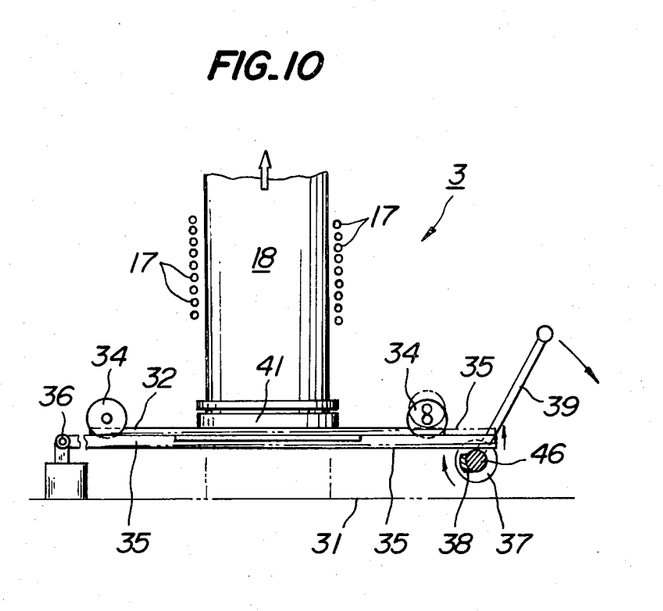

In the reparation of the furnace, it is desirable to demount the zones constituting the furnace separately. According to the invention, however, these zones are connected to each other in the vertical array, so that it is very difficult to demount each zone independently. For this end, the induction heating zone 3 is so constructed as to conveniently demount from the furnace body as shown in FIGS. 8 to 10. That is, the induction heating zone 3 can be demounted by loosening a clamp portion mounted on the lower end of the zone 3 and sliding it in a transverse direction as described in detail below.

On the lower end of the secondary coil 18 in the induction heating zone 3 is mounted a connection flange 41 having the same structure as the lower flange part 27 of the slidable flange coupling j. The connection flange 41 is jointed to an upper end of a chamber 31 constituting the cake cutting and cooling zone 4 by means of bolts in a vacuum tight state. Further, to the connection flange 41 is fixed an insulating substrate 32 composed of asbestos or the like by means of bolts. The insulating substrate 32 has an opening 33 passing the secondary coil 18 at its center portion and wheels 34 at its four corners. These wheels 34 are rotatably placed on a pair of inclinatable rails 35 which are horizontal under normal condition. One end of each inclinatable rail 35 is pivotably supported by a pin 36 disposed apart from the furnace and the other free end is placed on a rotating cam 38 provided in a grooved pulley 37 for preventing the swinging of the rail. Such grooved pulleys 37 are supported by a shaft 46 including a lever 39 at its center portion. Moreover, the rotating cam 38 is fixed to the shaft 46.

As shown in FIG. 10, when the lever 39 is pulled down in an arrow direction, the rotating cam 38 rotates so as to push up the free end of the rail 35, whereby the rail 35 is inclined around the pin 36. Therefore, when the connection flange 41 and slidable flange coupling j are released and the rails 35 are inclined by actuation of the lever 39, only the induction heating zone 3 can easily be moved along the inclined rails 35 by pushing in a transverse direction and simply removed out from the furnace body because the preheating zone 2 is held in the suspended state at its upper end. Moreover, when the induction heating zone 3 is again assembled into the furnace body, only the above operation is repeated reversely matching the zone 3 with the axial line of the furnace body.

As mentioned above, the shaft furnace according to the invention makes it possible to produce low-oxygen iron-base metallic powder in a high efficiency. Particularly, there are less operational troubles such as unstable descending of the cake due to the vertical array and the like and hence the sintered product cake can be obtained easily.

Furthermore, the invention can ensure a smooth operation under vacuum because the expansion of the furnace body caused by heating and cooling is efficiently absorbed by using a slidable flange coupling of a novel structure for connection between the preheating zone fixed at its upper end and the induction heating zone fixed at its lower end.

According to the invention, only the induction heating zone can be moved by means of rails in the transverse direction, so that the demounting of the furnace body is simple and hence the repairing is easy.

What is claimed is:

1. A shaft furnace for producing low-oxygen iron-base metallic powder for powder metallurgy comprising a zone of storing and feeding a raw steel powder, a preheating zone, an induction heating zone and a zone of cutting and cooling a product cake in a vertical array, characterized in that said preheating zone comprises a cylindrical furnace body lined with a refractory, a preheating tube passing through said furnace body at its center in the axial direction and tapered so as to enlarge the inner diameter from the upper end of the tube to the lower end thereof and a space defined between the inner wall of said furnace body and the outer wall of said preheating tube for indirectly heating said raw powder accummulated in the tube by combustion gas, and said induction heating zone comprises a primary coil for excitation repeatedly turned in a spiral form at its outermost part, a secondary coil for heating concentrically disposed inside said primary coil in a sleeve form and an insulating ceramic tube disposed inside said secondary coil through an adiabatic material.

2. A shaft furnace as claimed in claim 1, wherein said furnace body has a plurality of flame projecting ports disposed side by side at constant interval toward the axial direction and in places toward the circumferential direction and each of said ports provides with a burner.

3. A shaft furnace as claimed in claim 1, wherein said slidable flange coupling comprises a water-cooled upper flange part and a water-cooled lower flange part to be connected to said upper flange part by means of bolts.

4. A shaft furnace as claimed in claim 3, wherein said upper flange part includes a cylindrical body having grooves for O-ring and a grease groove at its inner wall and a water cooling space at its inside, and said lower flange part includes a water cooling space at its inside and a cylindrical body composed of two insulative rings superposed one upon the other through an O-ring.

5. A shaft furnace as claimed in claim 1, wherein said furnace further comprises a connection flange for airtightly connecting said induction heating zone to said cake cutting and cooling zone, an insulating substrate connected to said connection flange by means of bolt and having an opening for receiving said secondary coil at its center portion and wheels at its corners and a pair of inclinatable rails transversely rotating said wheels, and each of said rails is pivotably supported at one end and placed in a grooved pulley with a rotating cam at the other free end.

* * * * *